(12) United States Patent
Buczek et al.

(10) Patent No.: US 9,180,752 B2
(45) Date of Patent: Nov. 10, 2015

(54) ROTARY MODE DOOR FOR CONSTANT DEMIST BLEED

(71) Applicant: DENSO International America, Inc., Southfield, MI (US)

(72) Inventors: Melissa Buczek, Orion, MI (US); John Uhrick, Royal Oak, MI (US); Simon Kehimkar, Detroit, MI (US)

(73) Assignee: DENSO International America, Inc., Southfield, MI (US)

( * ) Notice: Subject to any disclaimer, the term of this patent is extended or adjusted under 35 U.S.C. 154(b) by 354 days.

(21) Appl. No.: 13/647,883

(22) Filed: Oct. 9, 2012

(65) Prior Publication Data

US 2014/0096554 A1 Apr. 10, 2014

(51) Int. Cl.
*B60H 1/32* (2006.01)
*B60H 1/00* (2006.01)

(52) U.S. Cl.
CPC ........ *B60H 1/00842* (2013.01); *B60H 1/00064* (2013.01); *B60H 2001/00164* (2013.01)

(58) Field of Classification Search
CPC .................................................. B60H 1/00842
USPC ............................ 62/239; 165/41, 42, 43, 202
See application file for complete search history.

(56) References Cited

U.S. PATENT DOCUMENTS

| | | | |
|---|---|---|---|
| 6,463,998 B1 * | 10/2002 | Shindo ........................... | 165/204 |
| 6,669,548 B2 | 12/2003 | Fujiwara | |
| 7,013,967 B2 * | 3/2006 | Kondo ........................... | 165/204 |
| 7,931,075 B2 * | 4/2011 | Ito et al. ......................... | 165/202 |
| 7,950,444 B2 | 5/2011 | Masatsugu | |
| 2003/0094262 A1 * | 5/2003 | Kondo ............................. | 165/42 |
| 2004/0074244 A1 * | 4/2004 | Ichishi et al. .................... | 62/186 |
| 2004/0093884 A1 | 5/2004 | Seki et al. | |
| 2004/0152410 A1 | 8/2004 | Seki | |
| 2005/0098311 A1 * | 5/2005 | Okumura et al. ...... | 165/204 B D |
| 2007/0181295 A1 * | 8/2007 | Masatsugu ..................... | 165/202 |
| 2007/0204985 A1 * | 9/2007 | Fukagawa et al. ............. | 165/203 |
| 2007/0266726 A1 * | 11/2007 | Tada et al. ........................ | 62/331 |
| 2009/0038774 A1 * | 2/2009 | Ogiso et al. ...................... | 165/42 |
| 2010/0263828 A1 * | 10/2010 | Chikagawa et al. ............. | 165/59 |
| 2011/0284183 A1 * | 11/2011 | Yamashita et al. .............. | 165/63 |

FOREIGN PATENT DOCUMENTS

| | | |
|---|---|---|
| JP | 59-089720 | 6/1984 |
| JP | 62-083710 | 5/1987 |
| JP | 07-329543 | 12/1995 |
| JP | 2004-067057 | 3/2004 |
| JP | 2005-104353 | 4/2005 |
| JP | 2010-095025 | 4/2010 |

OTHER PUBLICATIONS

Office action dated Mar. 11, 2014 in corresponding Japanese Application No. 2013-102154.
Office Action issued in related Japanese Application No. 2013-102154 dated Jan. 29, 2015.
Office Action dated Jul. 3, 2015 issued in the corresponding Chinese Application No. 201310117928.3 with English translation.

* cited by examiner

*Primary Examiner* — Emmanuel Duke
(74) *Attorney, Agent, or Firm* — Harness, Dickey & Pierce, P.L.C.

(57) ABSTRACT

A vehicle heating, ventilation, and air cooling (HVAC) system that includes a casing, an evaporator, and a heater core. The casing defines a windshield outlet, a side window outlet, a front face outlet, and a front foot outlet. The evaporator and heater core are both housed within the casing. The side window outlet is between the evaporator and the windshield outlet.

18 Claims, 2 Drawing Sheets

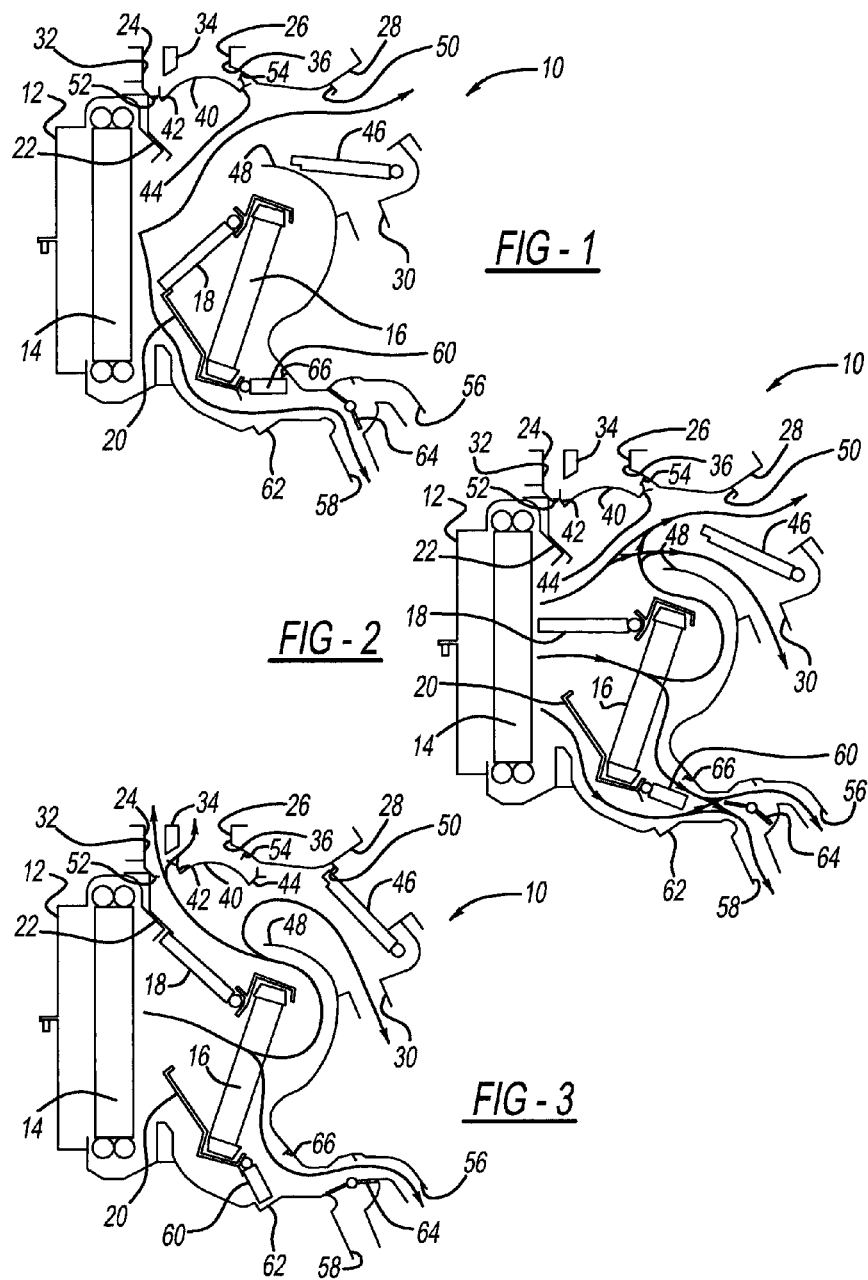

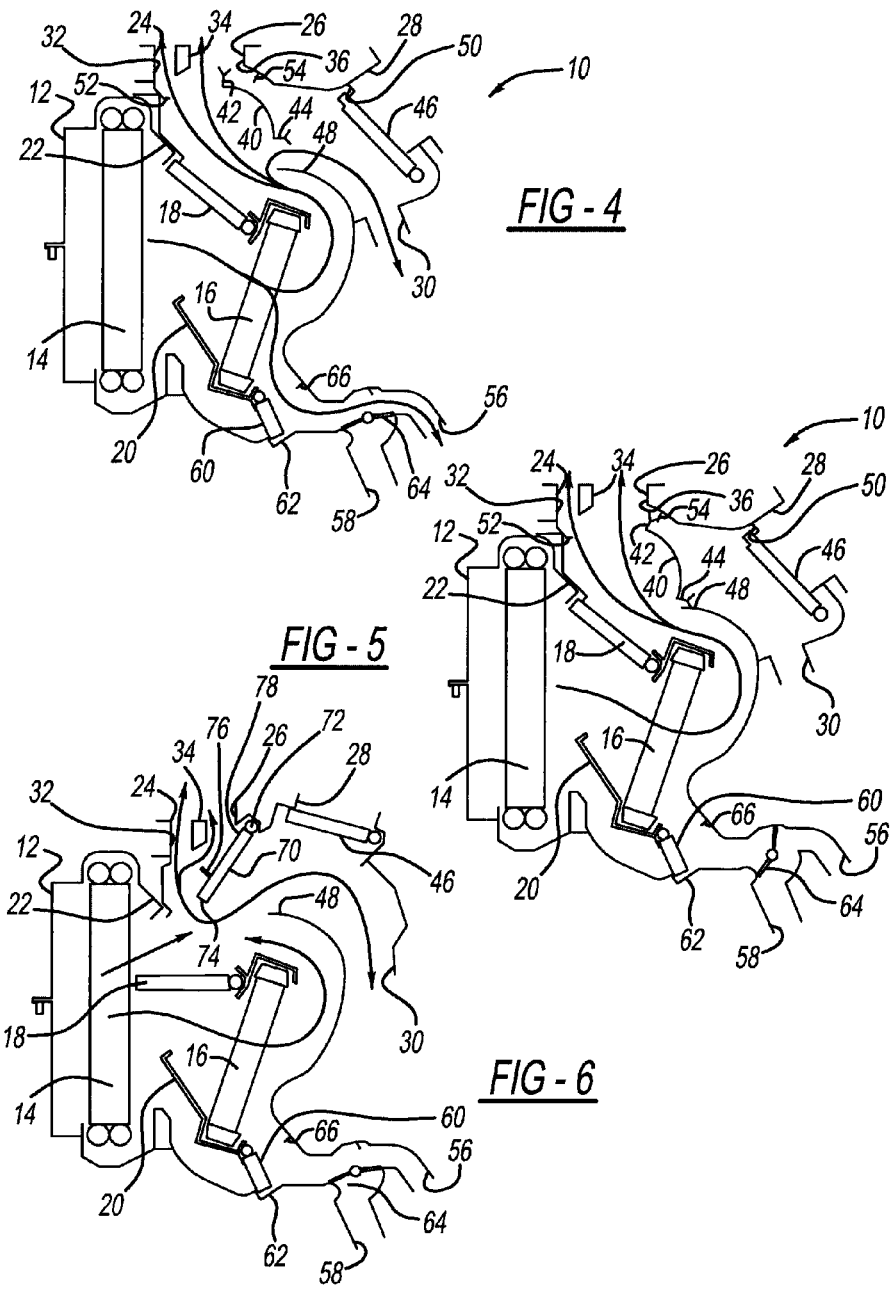

ROTARY MODE DOOR FOR CONSTANT DEMIST BLEED

FIELD

The present disclosure relates to heating, ventilation, and air cooling systems, and particularly to a rotary mode door for constant demist bleed.

BACKGROUND

This section provides background information related to the present disclosure, which is not necessarily prior art.

Motor vehicle heating, ventilation, and air cooling (HVAC) systems typically include an HVAC casing with an evaporator and a heater core housed therein. In a heating mode, airflow that has passed into the HVAC casing through the evaporator, which is often deactivated, is directed through the heater core by a temperature control door. In a cooling mode, the evaporator is activated and the temperature control door is positioned such that cooled airflow that has passed through the evaporator is directed around the heater core. A plurality of additional doors direct airflow out from within the casing to various areas within a passenger cabin of the motor vehicle. For example, a face outlet door controls airflow exiting the HVAC casing towards an upper portion of the passenger cabin and an occupant's face. A foot outlet door controls airflow exiting the HVAC casing towards a floor of the passenger cabin and an occupant's feet. Rear outlet doors control and direct airflow to a rear of the passenger cabin.

Motor vehicle HVAC systems also often include a windshield defrost mode and a side window demist mode. With typical HVAC systems, it is not possible to control side window demist operation independent of the windshield defrost operation, and to provide constant side window demist throughout different heating modes, such as foot and face heating modes, without including an excessive number of control doors. The present teachings address these issues by providing an automobile HVAC system that provides constant side window demist throughout various heating modes with a reduced number of control doors, which reduces costs, simplifies operation, and increases operational reliance of the HVAC system.

SUMMARY

This section provides a general summary of the disclosure, and is not a comprehensive disclosure of its full scope or all of its features.

The present teachings provide for a vehicle heating, ventilation, and air cooling (HVAC) system that includes a casing, an evaporator, and a heater core. The casing defines a windshield outlet, a side window outlet, a front face outlet, and a front foot outlet. The evaporator and heater core are both housed within the casing. The side window outlet is between the evaporator and the windshield outlet.

The present teachings also provide for a vehicle heating, ventilation, and air cooling system, which includes a casing that defines a windshield outlet, a side window outlet, a front face outlet, and a front foot outlet. A defrost partition of the casing separates the windshield outlet from the side window outlet. Both an evaporator and a heater core are housed within the casing. A single defrost control door regulates passage of airflow through the windshield outlet, the side window outlet, the front face outlet, and the front foot outlet.

The present teachings also provide for a vehicle heating, ventilation, and air cooling system that includes a casing defining a windshield outlet, a side window outlet, a front face outlet, and a front foot outlet. A defrost partition of the casing separates the windshield outlet from the side window outlet. An evaporator is housed within the casing. The side window outlet is between the evaporator and the windshield outlet. A heater core is also housed within the casing. Only a single defrost control door regulates passage of airflow through all of the windshield outlet, the side window outlet, the front face outlet, and the front foot outlet. The defrost control door is a rotary door.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a schematic view of an HVAC assembly according to the present teachings, the assembly in a face cooling mode;

FIG. 2 illustrates the HVAC assembly of FIG. 1 in a bi-level mode;

FIG. 3 illustrates the HVAC assembly of FIG. 1 in a foot heating mode;

FIG. 4 illustrates the HVAC assembly of FIG. 1 in a foot heating and defrost mode;

FIG. 5 illustrates the HVAC assembly of FIG. 1 in a defrost mode; and

FIG. 6 is a schematic view of another HVAC assembly according to the present teachings.

Corresponding reference numerals indicate corresponding parts throughout the several views of the drawings.

DETAILED DESCRIPTION

Example embodiments will now be described more fully with reference to the accompanying drawings.

With initial reference to FIGS. 1-3, a heating ventilation and air cooling (HVAC) assembly according to the present teachings is illustrated at reference numeral 10. The HVAC assembly 10 includes a casing 12, which houses various components of the HVAC assembly 10 including an evaporator 14 and a heater core 16. Mounted within the casing 12, generally between the evaporator 14 and the heater core 16 is a temperature control door 18. The temperature control door 18 is pivotally mounted within the casing 12, such that the temperature control door 18 is movable between a first temperature control door stop 20 and a second temperature control door stop 22. The first and the second temperature control door stops 20 and 22 are illustrated as spaced apart flanges of the casing 12. The first and the second temperature control door stops 20 and 22 can each be any suitable feature that will restrict range of motion of the temperature control door 18. While the temperature control door 18 is illustrated as a flag door, the temperature control door 18 can be any suitable door or device operable to direct airflow to a desired location within the casing 12.

The temperature control door 18 can be moved to any suitable position between the first and the second temperature control door stops 20 and 22. For example and as illustrated in FIG. 1, the temperature control door 18 can be moved to a first position in which it contacts the first temperature control door stop 20, which is proximate to the heater core 16. As illustrated in FIG. 2, the temperature control door 18 can be moved to an intermediate position between the first temperature control door stop 20 and the second temperature control door stop 22. With further reference to FIG. 3, the temperature control door 18 can be moved to a second position in which the temperature control door 18 abuts the second temperature control door stop 22. The manner in which the temperature control door 18 directs airflow within the casing 12 will be described further herein in conjunction with the description of the various heating and cooling modes of the HVAC assembly 10.

The casing 12 defines a plurality of airflow outlets including a side window outlet 24, a windshield outlet 26, a front face outlet 28, and a front foot outlet 30. The side window outlet 24 and the windshield outlet 26 are both defrost outlets, which direct warm air from the heater core 16 to a side window and a windshield respectively of a motor vehicle in which the HVAC assembly 10 is installed. Warm air directed to the side window from the side window outlet 24 can demist the side window, and thus the side window outlet 24 can be referred to as a side window demist outlet.

The side window outlet 24 is defined by a defrost outlet first side wall 32 of the casing 12 and a defrost partition 34 of the casing 12. The windshield outlet 26 is defined by the defrost partition 34 and a defrost outlet second side wall 36. The defrost partition 34 is between the defrost outlet first side wall 32 and the defrost outlet second side wall 36. The defrost partition 34 is closer to the defrost outlet first side wall 32 than the defrost outlet second side wall 36, thus making the side window outlet 24 smaller than the windshield outlet 26. The side window outlet 24 is proximate to the evaporator 14, and is closer to the evaporator 14 than the heater core 16.

The HVAC assembly 10 further includes a defrost control door 40, which is mounted within the casing 12 proximate to, and selectively movable between, the side window outlet 24, the windshield outlet 26, the front face outlet 28, and the front foot outlet 30. The defrost control door 40 includes a first flange 42 and a second flange 44 extending from opposite ends of the defrost control door 40. The defrost control door 40 is illustrated in FIGS. 1-5 as a rotary door, but the defrost control door 40 can be any other suitable door or device operable to selectively permit airflow to pass out from within the casing 12 through the side window outlet 24, the windshield outlet 26, the front face outlet 28, or the front foot outlet 30, as further described herein.

Also mounted within the casing 12 is a front outlet control door 46. The front outlet control door 46 is mounted between the front face outlet 28 and the front foot outlet 30 to selectively direct airflow through either the front face outlet 28, or the front foot outlet 30. The front outlet control door 46 is movable between a first position (FIG. 1) in which it abuts a door stop 48 and a second position (FIG. 3) in which it abuts a face outlet door stop 50. In the first position, the front outlet control door 46 obstructs airflow from passing out of the casing 12 through the front foot outlet 30, but does not obstruct airflow from passing out through the front face outlet 28. In the second position, the front outlet control door 46 obstructs airflow from passing out from within the casing 12 through the front face outlet 28, but does not obstruct airflow from passing out through the front foot outlet 30. The front outlet control door 46 can also be arranged in an intermediate position (FIG. 2) between the front face outlet 28 and the front foot outlet 30 to allow airflow to exit the casing 12 through each of the outlets 28 and 30.

The casing 12 also includes a first defrost outlet door stop 52 and a second defrost outlet door stop 54. The first defrost outlet door stop 52 is proximate to and can be integral with the defrost outlet first side wall 32. The second defrost outlet door stop 54 is proximate to the defrost outlet second side wall 36 and can be integral with the defrost outlet second side wall 36. As further described herein, the first and the second defrost outlet door stops 52 and 54 are arranged to abut the first flange 42 and the second flange 44 of the defrost control door 40 respectively when the defrost control door 40 is positioned such that it extends across each of the side window outlet 24 and the windshield outlet 26 to obstruct airflow through each of the outlets 24 and 26.

The casing 12 further defines a rear foot outlet 56 and a rear face outlet 58. The rear foot outlet 56 generally extends to a rear portion of the passenger cabin in which the HVAC assembly 10 is installed to direct airflow downward in the direction of the feet of occupants seated in the rear of the vehicle. A rear face outlet 58 similarly extends to the rear of the passenger cabin and is arranged to direct airflow upward towards the faces of occupants seated in the rear of the passenger cabin.

Also mounted within the casing 12 is a first rear outlet control door 60 and a second rear outlet control door 64. The first rear outlet control door 60 is movable between a first position (FIG. 1), a second position (FIG. 3), and an intermediate position (FIG. 2). In the first position, the rear outlet control door 60 is orientated to restrict airflow from passing from the heater core 16 to either the rear foot outlet 56 or the rear face outlet 58. In the second position, the first rear outlet control door 60 is seated within a casing stop 62 defined within the casing 12 to permit airflow that has passed through the heater core 16 to flow towards the rear foot and face outlets 56 and 58, and to prevent airflow from passing around the heater core 16 to the rear foot and face outlets 56 and 58. The second rear outlet control door 64 is arranged proximate to each of the rear foot outlet 56 and the rear face outlet 58 in order to selectively direct airflow to one or both of the rear foot and face outlets 56 and 58, or to restrict airflow to both of the rear foot and face outlets 56 and 58.

Operation of the HVAC assembly 10 will now be described in detail. FIG. 1 illustrates the HVAC assembly 10 in a face cooling mode. In the face cooling mode, the evaporator 14 is activated. Airflow enters the casing 12 by passing through the evaporator 14. The temperature control door 18 is arranged in the first position such that it contacts the first temperature control door stop 20, and thus deflects airflow away from the heater core 16 to prevent airflow from passing through the heater core 16. The defrost control door 40 is positioned such that the first flange 42 contacts the first defrost outlet door stop 52 and the second flange 44 contacts the second defrost outlet door stop 54, thereby preventing airflow from exiting the casing 12 through either the side window outlet 24 or the windshield outlet 26. The front outlet control door 46 is positioned such that it contacts the door stop 48, thereby permitting airflow to exit the casing 12 through the front face outlet 28. When the front outlet control door 46 is in contact with the door stop 48 as illustrated, the front outlet control door 46 prevents airflow from exiting the casing 12 through the front foot outlet 30.

To direct airflow towards the face of a passenger seated in the rear of a vehicle, the first rear outlet control door 60 is arranged in the first position such that the door 60 abuts rear outlet control door stop 66, which allows airflow to pass around the heater core 16 to the rear face outlet 58. The second rear outlet control door 64 is positioned to block the rear foot outlet 56, but not block the rear face outlet 58, thereby allowing airflow to pass through the rear face outlet 58, but not the rear foot outlet 56. Because all airflow passes through the activated evaporator 14 in the face cooling mode, but does not pass through the heater core 16, airflow exiting the casing 12 through the front face outlet 28 and the rear face outlet 58 is cooled, thereby providing for relatively cold air to be directed upwards towards the faces of passengers seated in the front and rear of the vehicle.

A bi-level mode of the HVAC assembly 10 is illustrated in FIG. 2. In the bi-level mode, the temperature control door 18 is positioned approximately halfway between the first temperature control door stop 20 and the second temperature control door stop 22, thereby permitting airflow introduced into the casing 12 through the evaporator 14 to pass both through and around the heater core 16. In the bi-level mode, both the evaporator 14 and the heater core 16 are activated, and thus airflow from the evaporator 14 will be cooled and airflow that passes through the heater core 16 will be heated. Therefore, airflow from the evaporator 14 that does not pass through the heater core 16 will be relatively cooler than airflow that does pass through the heater core 16.

The front outlet control door 46 is arranged about midway between the door stop 48 and the face outlet door stop 50 to permit airflow to exit the casing 12 through both the front face outlet 28 and the front foot outlet 30. The first rear outlet control door 60 is arranged about midway between the casing stop 62 and rear outlet control door stop 66, thereby permitting airflow to pass beyond the door 60 from each of the evaporator 14 and the heater core 16. The second rear outlet control door 64 is arranged to permit airflow to pass out from within the casing 12 to each of the rear foot outlet 56 and the rear face outlet 58.

Prior to exiting the casing 12, cooled airflow from the evaporator 14 and heated airflow from the heater core 16 is generally mixed to provide airflow of a relatively moderate temperature. This moderate temperature airflow exits the casing 12 through each of the front face outlet 28, the front foot outlet 30, the rear foot outlet 56, and the rear face outlet 58 in order to introduce generally mild airflow throughout the passenger cabin. In this bi-level mode, the defrost control door 40 remains in the same position as in the face cooling mode of FIG. 1, and thus prevents airflow from exiting through either the side window outlet 24 or the windshield outlet 26.

A foot heating mode of the HVAC assembly 10 is illustrated in FIG. 3. The temperature control door 18 is moved to the second position in which it contacts the second temperature control door stop 22, thereby preventing airflow that has passed through the evaporator 14 from passing around the heater core 16. The first rear outlet control door 60 is moved to the second position such that it contacts the casing stop 62 of the casing 12 to further prevent airflow from passing around the heater core 16. Therefore, in the foot heating mode, all airflow is directed through the heater core 16, which is activated to elevate the temperature of the airflow. Generally, the evaporator 14 is not activated in the foot heating mode.

To direct airflow out from within the casing 12 through the front foot outlet 30, the front outlet control door 46 is arranged such that it abuts the face outlet door stop 50 and prevents airflow from passing out of the casing 12 through the front face outlet 28. The heated airflow is thus free to exit the casing 12 through the front foot outlet 30, which directs the heated airflow towards the floor of the passenger cabin and the feet of occupants seated therein. The second rear outlet control door 64 is arranged to block the rear face outlet 58, but not the rear foot outlet 56, thereby directing airflow out from within the casing 12 through the rear foot outlet 56 towards the rear floor of the passenger cabin and the feet of passengers seated at the rear of the passenger cabin.

In the foot heating mode of FIG. 3, the defrost control door 40 is rotated away from the side window outlet 24 in order to not obstruct the side window outlet 24 to allow airflow to exit the casing 12 through the side window outlet 24. Because the airflow has been warmed by the heater core 16, airflow that exits the casing 12 through the side window outlet 24, which is directed to one or more side windows of the motor vehicle, will demist or defrost the side windows. The defrost control door 40 is positioned such that the first flange 42 is generally aligned with, and spaced apart from, the defrost partition 34 to generally define a gap between the first flange 42 and the defrost partition 34. Through this gap, airflow warmed by the heater core 16 can pass and exit the casing 12 through the windshield outlet 26. The relatively warm airflow passing through the windshield outlet 26 will defrost the windshield of the motor vehicle upon contacting a surface of the windshield.

FIG. 4 illustrates a foot heating/defrost mode of the HVAC assembly 10. In the foot heating/defrost mode of FIG. 4, the temperature control door 18, the front outlet control door 46, the first rear outlet control door 60, and the second rear outlet control door 64 are arranged in the same positions described above with respect to the foot heating mode of FIG. 3 in order to direct relatively warm airflow out from within the casing 12 through the front foot outlet 30 and the rear foot outlet 56, which directs the relatively warm airflow toward the floor of the front and rear portions of the passenger cabin. The only substantial difference between the foot heating mode of FIG. 3 and the foot heating/defrost mode of FIG. 4 is that the defrost control door 40 is further rotated away from the windshield outlet 26 to permit a greater amount of airflow warmed by the heater core 16 to exit the casing 12 through the windshield outlet 26. More specifically, the defrost control door 40 is positioned such that the first flange 42 is approximately equidistant between the defrost partition 34 and the defrost outlet second side wall 36 defining the windshield outlet 26, and the second flange 44 is arranged between the second defrost outlet door stop 54 and the door stop 48, thereby permitted airflow to pass through each of the side window outlet 24, the windshield outlet 26, and the front foot outlet 30.

FIG. 5 illustrates the HVAC assembly 10 in a defrost mode. In the defrost mode, the temperature control door 18 and the first rear outlet control door 60 are oriented in the same positions set forth above in the foot heating mode of FIG. 3 and the foot heating/defrost mode of FIG. 4. Therefore, all airflow entering the casing 12 through the evaporator 14, which is activated, flows through and is heated by the heater core 16. In the defrost mode, the defrost control door 40 is further rotated away from the windshield outlet 26 such that the first flange 42 contacts the second defrost outlet door stop 54 and the second flange 44 contacts the door stop 48 so as to permit warmed airflow from the heater core 16 to flow unobstructed through both the windshield outlet 26 and the side window outlet 24. The defrost control door 40 prevents airflow from passing to either the front face outlet 28 or the front foot outlet 30, thereby restricting airflow to the front portion of the passenger cabin. The second rear outlet control door 64 is arranged to block both the rear foot outlet 56 and the rear face outlet 58, and thus restrict airflow to the rear of the motor vehicle. In the defrost mode of FIG. 5, airflow from within the casing 12 is directed solely through the side window outlet 24 and the windshield outlet 26. No airflow is directed towards passengers of the motor vehicle.

The HVAC assembly 10 can include any suitable type of doors or devices to direct airflow through and out from within the casing 12. For example, the defrost control door 40, which is described above as a rotary door, can be replaced with a flag defrost control door 70 as illustrated in FIG. 6. The flag defrost control door 70 includes a first end 72 and a second end 74 that is opposite to the first end 72. The first end 72 is pivotally mounted within the casing 12 between the windshield outlet 26 and the front face outlet 28. Proximate to the second end 74 is a flange 76, which extends from the door 70 generally perpendicular to a base 78 of the door 70. The door 70 is sized such that the base 78 can extend across both the windshield outlet 26 and the side window outlet 24, and the flange 76 is positioned such that it can contact the defrost partition 34 when the flag defrost control door 70 is positioned to block airflow from passing through either the side window outlet 24 or the windshield outlet 26. The flag defrost control door 70 is further sized such that the second end 74 will contact the door stop 48 when the door 70 is in the defrost mode of FIG. 5, in which the flag defrost control door 70 prevents airflow from passing to either the front face outlet 28 or the front foot outlet 30.

The present teachings thus permit passage of airflow through the side window outlet 24 in each of the foot heating mode of FIG. 3, the foot heating/defrost mode of FIG. 4, and the defrost mode of FIG. 5. Such a constant, warmed airflow to one or more of the side windows in each of the various heating modes is advantageous for a number of reasons, such as to minimize the occurrence of undesirable frost and condensation forming on the side windows, which may obstruct views out through the windows. Such constant airflow through the side window outlet 24 is accomplished with only a single defrost control door 40 and only a single front outlet control door 46, thereby reducing the cost of the HVAC assembly 10, while at the same time increasing performance and reliability of the HVAC assembly 10.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle heating, ventilation, and air cooling (HVAC) system comprising: a casing defining a windshield outlet, a side window outlet, a front face outlet, and a front foot outlet; an evaporator housed within the casing; and a heater core housed within the casing; wherein: the side window outlet is between the evaporator and the windshield outlet; only a single defrost control door regulates passage of airflow through both the windshield outlet and the side window outlet; in a foot heating mode the single defrost control door is arranged to permit heated airflow to pass through the side window outlet unobstructed by the single defrost control door, and partially obstruct heated airflow from flowing through the windshield outlet in a foot heating/defrost mode the single defrost control door is arranged to permit heated airflow to pass through the side window outlet and the windshield outlet unobstructed by the single defrost control door, in the foot heating/defrost mode the single defrost control door is further from the side window outlet as compared to the foot heating mode; in a defrost mode the single defrost control door is arranged to permit heated airflow to pass through both the side window outlet and the windshield outlet unobstructed by the single defrost control door; and only a single front outlet control door regulates passage of airflow through only the front face outlet and the front foot outlet.

2. The vehicle HVAC system of claim 1, further comprising a temperature control door mounted within the casing between the evaporator and the heater core, wherein: the temperature control door is movable between a first position and a second position, in the first position the temperature control door prevents airflow from passing through the heater core, in the second position the temperature control door both permits airflow through the heater core and restricts airflow from passing around the heater core, and the temperature control door permits airflow to pass both through and around the heater core when arranged between the first position and the second position.

3. The vehicle HVAC system of claim 1, further comprising the defrost control door mounted within the casing and selectively movable to each of the side window outlet, the windshield outlet, the front face outlet, and the front foot outlet, wherein:
the defrost control door is movable to a first position, a second position, and a third position;
in the first position, the defrost control door is arranged to prevent airflow from passing through both the side window outlet and the windshield outlet, and permit airflow to pass beyond the defrost control door towards both the front face outlet and the front foot outlet;
in the second position, the defrost control door is arranged to permit airflow to pass through both the side window outlet and the windshield outlet, and permit airflow to pass beyond the defrost control door towards both the front face outlet and the front foot outlet; and
in the third position, the defrost control door is arranged to permit airflow to pass through the side window outlet and the windshield outlet, and prevent airflow from passing through the front face outlet and the front foot outlet.

4. The vehicle HVAC system of claim 1, further comprising the front outlet control door between the front face outlet and the front foot outlet that is movable between a first position and a second position, in the first position the front outlet control door obstructs passage of airflow through the front foot outlet and permits passage of airflow through the front face outlet, and in the second position the front outlet control door obstructs passage of airflow through the front face outlet and permits passage of airflow through the front foot outlet.

5. The vehicle HVAC system of claim 1, wherein the casing further defines a rear face outlet and a rear foot outlet.

6. The vehicle HVAC system of claim 1, wherein the defrost control door is a rotary door.

7. The vehicle HVAC system of claim 1, wherein the defrost control door is a flag door.

8. The vehicle HVAC system of claim 1, wherein the defrost control door is a flag door that includes a vertical flange extending from a base of the defrost control door, the vertical flange is configured to abut a partition of the casing between the side window outlet and the windshield outlet when the defrost control door is in a closed position.

9. A vehicle heating, ventilation, and air cooling (HVAC) system comprising: a casing defining a windshield outlet, a side window outlet, a front face outlet, and a front foot outlet; a defrost partition of the casing separating the windshield outlet from the side window outlet; an evaporator housed within the casing; a heater core housed within the casing; and a single defrost control door that regulates passage of airflow through each of the windshield outlet, the side window outlet, the front face outlet, and the front foot outlet; wherein: in a foot heating mode the single defrost control door is arranged to permit heated airflow to pass through the side window outlet unobstructed by the single defrost control door, and partially obstruct heated airflow from flowing through the windshield outlet in a foot heating/defrost mode the single defrost control door is arranged to permit heated airflow to pass through the side window outlet and the windshield outlet unobstructed by the single defrost control door, in the foot heating/defrost mode the single defrost control door is further from the side window outlet as compared to the foot heating mode; and in a defrost mode the single defrost control door is arranged to permit heated airflow to pass through both the side window outlet and the windshield outlet unobstructed by the single defrost control door.

10. The HVAC system of claim 9, wherein the side window outlet is between the evaporator and the windshield outlet.

11. The HVAC system of claim 9, wherein only the single defrost control door regulates passage of airflow through all of the windshield outlet, the side window outlet, the front face outlet, and the front foot outlet.

12. The HVAC system of claim 9, wherein the defrost control door is a rotary door.

13. The HVAC system of claim 9, wherein the defrost control door is a flag door that includes a vertical flange extending from a base of the defrost control door, the vertical flange is configured to abut the defrost partition when the defrost control door is in a closed position.

14. The HVAC system of claim 9, wherein the casing further defines a rear face outlet and a rear foot outlet.

15. The HVAC system of claim 9, wherein:
the defrost control door is movable to a first position, a second position, and a third position;
in the first position, the defrost control door is arranged to prevent airflow from passing through both the side window outlet and the windshield outlet, and permit airflow to pass beyond the defrost control door towards both the front face outlet and the front foot outlet;
in the second position, the defrost control door is arranged to permit airflow to pass through both the side window outlet and the windshield outlet, and permit airflow to pass beyond the defrost control door towards both the front face outlet and the front foot outlet; and
in the third position, the defrost control door is arranged to permit airflow to pass through the side window outlet and the windshield outlet, and prevent airflow from passing through the front face outlet and the front foot outlet.

16. A vehicle heating, ventilation, and air cooling (HVAC) system comprising: a casing defining a windshield outlet, a side window outlet, a front face outlet, and a front foot outlet; a defrost partition of the casing separating the windshield outlet from the side window outlet; an evaporator housed within the casing, the side window outlet is between the evaporator and the windshield outlet; a heater core housed within the casing; and only a single defrost control door regulates passage of airflow through all of the windshield outlet, the side window outlet, the front face outlet, and the front foot outlet, the defrost control door is a rotary door; wherein: in a foot heating mode the single defrost control door is arranged to permit heated airflow to pass through the side window outlet unobstructed by the single defrost control door, and partially obstruct heated airflow from flowing through the windshield outlet; in a foot heating/defrost mode the single defrost control door is arranged to permit heated airflow to pass through the side window outlet and the windshield outlet unobstructed by the single defrost control door, in the foot heating/defrost mode the single defrost control door is further from the side window outlet as compared to the foot heating mode; and in a defrost mode the single defrost control door is arranged to permit heated airflow to pass through both the side window outlet and the windshield outlet unobstructed by the single defrost control door.

17. The vehicle HVAC system of claim 16, wherein the casing further defines a rear face outlet and a rear foot outlet.

18. The vehicle HVAC system of claim 16, wherein a single temperature control door directs airflow through or around the heater core.

* * * * *